(12) United States Patent
Min

(10) Patent No.: US 11,772,592 B2
(45) Date of Patent: Oct. 3, 2023

(54) SEAT AIRBAG DEVICE FOR VEHICLE

(71) Applicant: HYUNDAI MOBIS CO., LTD., Seoul (KR)

(72) Inventor: Byung Ho Min, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/865,563

(22) Filed: Jul. 15, 2022

(65) Prior Publication Data

US 2023/0067856 A1 Mar. 2, 2023

(30) Foreign Application Priority Data

Aug. 27, 2021 (KR) .......................... 10-2021-0113930

(51) Int. Cl.
| | |
|---|---|
| *B60R 21/207* | (2006.01) |
| *B60R 21/2338* | (2011.01) |
| *B60R 21/231* | (2011.01) |
| *B60R 21/233* | (2006.01) |

(52) U.S. Cl.
CPC .......... *B60R 21/207* (2013.01); *B60R 21/233* (2013.01); *B60R 21/2338* (2013.01); *B60R 21/23138* (2013.01); *B60R 2021/23146* (2013.01); *B60R 2021/23324* (2013.01); *B60R 2021/23386* (2013.01)

(58) Field of Classification Search
None
See application file for complete search history.

(56) References Cited

U.S. PATENT DOCUMENTS

| | | | | |
|---|---|---|---|---|
| 9,573,553 | B2* | 2/2017 | Ko | B60R 21/13 |
| 10,850,699 | B2* | 12/2020 | Dry | B60R 21/207 |
| 11,084,447 | B2* | 8/2021 | Rupp | B60R 21/231 |
| 11,091,115 | B2* | 8/2021 | Saso | B60R 21/21 |
| 11,338,759 | B2* | 5/2022 | Nakajima | B60R 21/233 |
| 11,383,667 | B1* | 7/2022 | Kadam | B60R 21/207 |
| 2019/0016293 | A1* | 1/2019 | Saso | B60R 21/264 |
| 2021/0001799 | A1* | 1/2021 | Sandinge | B60R 21/2338 |
| 2021/0061211 | A1* | 3/2021 | Jung | B60R 21/2338 |
| 2022/0379833 | A1* | 12/2022 | Shimizu | B60R 21/23138 |
| 2022/0388472 | A1* | 12/2022 | Hwangbo | B60R 21/2338 |

FOREIGN PATENT DOCUMENTS

| | | | |
|---|---|---|---|
| KR | 102209220 B1 * | 1/2021 | |
| KR | 20210058424 A * | 5/2021 | |
| KR | 20210059986 A * | 5/2021 | |
| KR | 1020210070413 A | 6/2021 | |
| KR | 20220164314 A * | 12/2022 | |
| WO | WO-2021065304 A1 * | 4/2021 | |

* cited by examiner

*Primary Examiner* — Faye M Fleming
(74) *Attorney, Agent, or Firm* — NovoTechIP International PLLC

(57) ABSTRACT

The present invention provides a seat airbag device for a vehicle, the seat airbag device including an airbag cushion including a lateral chamber positioned at lateral sides of a passenger and configured to be deployed forward from a seatback of a vehicle, a front chamber configured to be deployed forward from an upper side of the seatback to surround the passenger, and an auxiliary chamber configured to be deployed from the front chamber toward a front side of the passenger so as to be positioned between the front chamber and the passenger, and a support tether extending from the seatback and connected to the airbag cushion to support the airbag cushion.

12 Claims, 8 Drawing Sheets

SEAT AIRBAG DEVICE FOR VEHICLE

CROSS-REFERENCE TO RELATED APPLICATIONS

The present application claims priority to Korean Patent Application No. 10-2021-0113930, filed Aug. 27, 2021, the entire contents of which is incorporated herein for all purposes by this reference.

BACKGROUND

1. Technical Field

The present invention relates to a technology related to a seat airbag device mounted in a seat of a vehicle and configured to surround and protect a passenger.

2. Discussion of Related Art

An airbag refers to a device for protecting an occupant from impact caused by a vehicle collision and includes a cushion which is rapidly filled with air to protect the occupant in the event of an accident. Airbags have been developed continuously since the 1950s. The airbag has developed as the first-generation airbag that was simply inflated, the second-generation airbag that minimizes an injury to a passenger by reducing a deployment pressure of the airbag, and the third-generation airbag that is inflated while detecting impact strength and controlling a pressure. Currently, the fourth-generation airbag is commercially available and produced. The fourth-generation airbag is appropriately inflated on the basis of a result of autonomously detecting an occupant's position, physique, and posture and determining a degree of a vehicle collision.

Meanwhile, studies are also being actively conducted on autonomous vehicles that may autonomously travel without a driver's manipulation. The airbag, which serves to ensure the occupant's safety, changes in various ways to conform to the development of the autonomous vehicles. With the development of autonomous driving technologies, the driver's intervention on the control and braking of the vehicle is decreasing. As a result, consumer demands for vehicle safety devices are expected to increase.

In particular, vehicles are evolving from vehicles used as simple means of transportation to vehicles for providing living spaces in the vehicles. Therefore, the arrangement of seats and the postures of the occupants in the vehicle are expected to change. In consideration of this situation, the shape of the airbag is also expected to change. In the current vehicle, the seats are arranged to be directed toward the front side of the vehicle. However, the arrangement of the seats in the vehicle is expected to change in the future so that the seats are placed to face one another or the orientation of the seats may be freely and independently adjusted. Accordingly, in consideration of the arrangement of the seats in the autonomous vehicles, studies are being conducted on a seat-deployment airbag that surrounds the whole body of the occupant from the left and right sides of the seat, unlike the existing airbag shape.

However, in the case of the airbag developed in the related art, the airbag is configured to be deployed toward the periphery of the upper body of the occupant. For this reason, there is a problem in that the airbag cannot protect the entire upper body of the occupant from the impact. In addition, the airbag in the related art cannot solve the problem in that the occupant may be injured by a submarine phenomenon that occurs in the event of an accident. Accordingly, there is a need to solve these problems.

The foregoing explained as the background is intended merely to aid in the understanding of the background of the present invention, and is not intended to mean that the present invention falls within the purview of the related art that is already known to those skilled in the art.

SUMMARY

The present invention is proposed to solve these problems and aims to a seat airbag device for a vehicle, in which airbag cushions are deployed from lateral sides and an upper side of a seat to restrain a passenger and protect the passenger from external impact.

An embodiment of the present invention provides a seat airbag device for a vehicle, the seat airbag device including: an airbag cushion including a lateral chamber positioned at lateral sides of a passenger and configured to be deployed forward from a seatback of a vehicle, a front chamber configured to be deployed forward from an upper side of the seatback to surround the passenger, and an auxiliary chamber configured to be deployed from the front chamber toward a front side of the passenger so as to be positioned between the front chamber and the passenger; and a support tether extending from the seatback and connected to the airbag cushion to support the airbag cushion.

The auxiliary chamber may extend from lateral sides of the front chamber, and the auxiliary chamber may be bent toward the passenger and disposed at the front side of the passenger so as to overlap the front chamber.

Ends of the auxiliary chamber extending from the lateral sides of the front chamber may be connected to the front chamber at sides opposite to a direction in which the auxiliary chamber extends.

The auxiliary chamber may be provided as a pair of auxiliary chambers extending from two opposite sides of the front chamber, and the pair of auxiliary chambers may be bent toward the passenger such that the ends of the pair of auxiliary chambers are connected to each other.

The seat airbag device may further include an inflator connected to the airbag cushion and configured to deploy the airbag cushion by injecting gas into the airbag cushion.

The inflator may be connected to the lateral chamber and inject gas into the lateral chamber, and the lateral chamber may communicate with the front chamber.

The lateral chamber may be connected to and communicate with an upper portion of the front chamber, and the front chamber may communicate with the auxiliary chamber.

The support tether may extend from a lateral side of the seatback, surround the lateral chamber, and be connected to an end of the front chamber.

The support tether may further include an auxiliary tether extending from an upper side of the seatback, connected to an end of the front chamber, extending from a lateral side of the seatback, and connected to the support tether.

An end of the auxiliary tether may be connected to an end of the support tether.

An end of the auxiliary tether may be connected to a middle portion of the support tether.

The lateral chamber may be provided as a pair of lateral chambers, the support tether may be provided as a pair of support tethers, and the pair of lateral chambers and the pair of support tethers may be disposed at two opposite sides of the passenger.

According to the seat airbag device for a vehicle according to the present invention, in a state in which the passenger is seated in the seat, the lateral chamber is deployed at the lateral sides of the passenger, and the front chamber is deployed and extends forward from the upper side of the passenger, such that the front side and the two opposite sides of the passenger may be protected by the lateral chamber and the front chamber. The upper portion of the lateral chamber communicates with the front chamber, such that the front chamber is deployed forward from the upper side of the passenger after the lateral chamber is deployed. Therefore, it is possible to protect the passenger.

In addition, the auxiliary chamber is provided and configured to be deployed from the front chamber toward the passenger, thereby increasing the amount of mitigating the impact at the front side of the passenger.

In addition, the support tether extends from the seatback and is connected to the front chamber so as to support the front chamber and the lateral chamber. The auxiliary tether extends from the seatback and is connected to the support tether. Therefore, it is possible to restrain the passenger in the airbag cushion.

DETAILED DESCRIPTION

Figure 1:
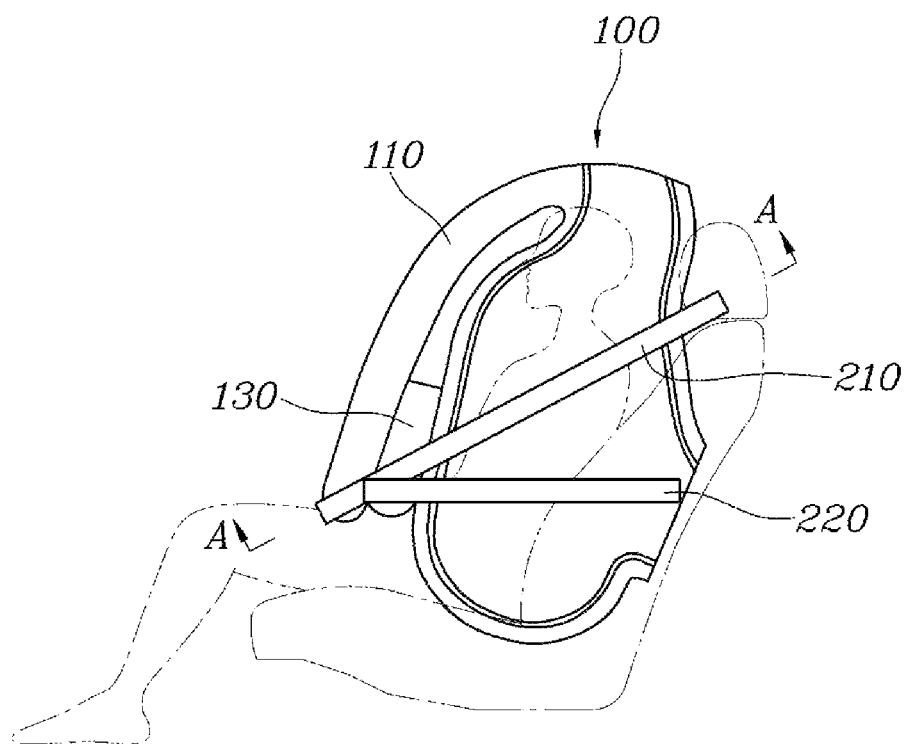
FIG. 1 is a side view illustrating a seat airbag device for a vehicle according to a first embodiment of the present invention.

Specific structural or functional descriptions of embodiments of the present invention disclosed in this specification or application are exemplified only for the purpose of explaining the embodiments according to the present invention, the embodiments according to the present invention may be carried out in various forms, and it should not be interpreted that the present invention is limited to the embodiments described in this specification or application.

Because the embodiments according to the present invention may be variously changed and may have various forms, specific embodiments will be illustrated in the drawings and described in detail in the present specification or application. However, the descriptions of the specific embodiments are not intended to limit embodiments according to the concept of the present invention to the specific embodiments, but it should be understood that the present invention covers all modifications, equivalents and alternatives falling within the spirit and technical scope of the present invention.

The terms such as "first" and "second" may be used herein only to describe various elements, but these elements should not be limited by these terms. These terms are used only for the purpose of distinguishing one constituent element from other constituent elements. For example, without departing from the scope according to the concept of the present invention, the first constituent element may be referred to as the second constituent element, and similarly, the second constituent element may also be referred to as the first constituent element.

When one constituent element is described as being "coupled" or "connected" to another constituent element, it should be understood that one constituent element can be coupled or connected directly to another constituent element, and an intervening constituent element can also be present between the constituent elements. When one constituent element is described as being "coupled directly to" or "connected directly to" another constituent element, it should be understood that no intervening constituent element is present between the constituent elements. Other expressions, that is, "between" and "just between" or "adjacent to" and "directly adjacent to", for explaining a relationship between constituent elements, should be interpreted in a similar manner.

The terms used in the present specification are used to just describe a specific embodiment and do not intend to limit the present invention. Singular expressions include plural expressions unless clearly described as different meanings in the context. In the present specification, it should be understood the terms "comprises," "comprising," "includes," "including," "containing," "has," "having" or other variations thereof are inclusive and therefore specify the presence of stated features, numbers, steps, operations, elements, components, or combinations thereof, but do not preclude the presence or addition of one or more other features, numbers, steps, operations, elements, components, or combinations thereof.

Unless otherwise defined, all terms used herein, including technical or scientific terms, have the same meaning as commonly understood by those skilled in the art to which the present invention pertains. The terms such as those defined in commonly used dictionaries should be interpreted as having meanings consistent with meanings in the context of related technologies and should not be interpreted as ideal or excessively formal meanings unless explicitly defined in the present specification.

Hereinafter, the present invention will be described in detail through description of preferred embodiments of the present invention with reference to the accompanying drawings. Like reference numerals indicated in the respective drawings refer to like members.

As types of vehicles gradually change to autonomous vehicles, a direction of a seat in which a passenger is seated and a reclining angle of a seatback are variously changed in respect to a seat airbag device for a vehicle according to the present invention. Therefore, a seating direction and a seating posture of the passenger are variously changed. In this case, there is a need to protect the passenger in all the directions based on the passenger in the event of a collision accident of the vehicle.

Accordingly, the seat airbag device for a vehicle according to the present invention includes an airbag cushion 100 which is deployed from the seat to protect the passenger in all directions.

Figure 2:
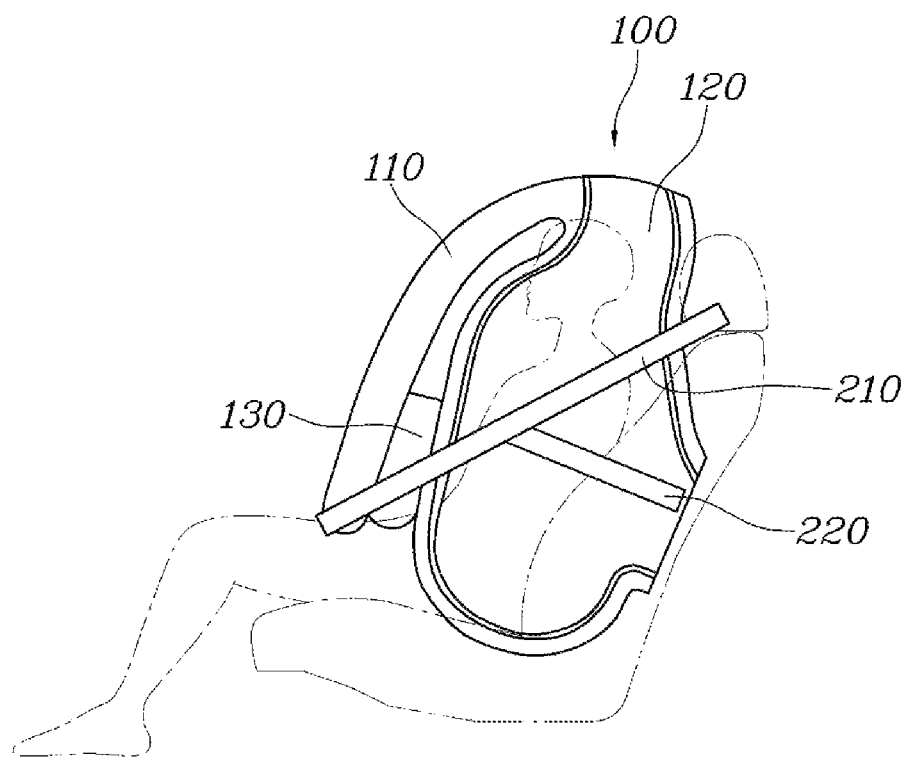
FIG. 2 is a side view illustrating a seat airbag device for a vehicle according to a second embodiment of the present invention.
Figure 3:
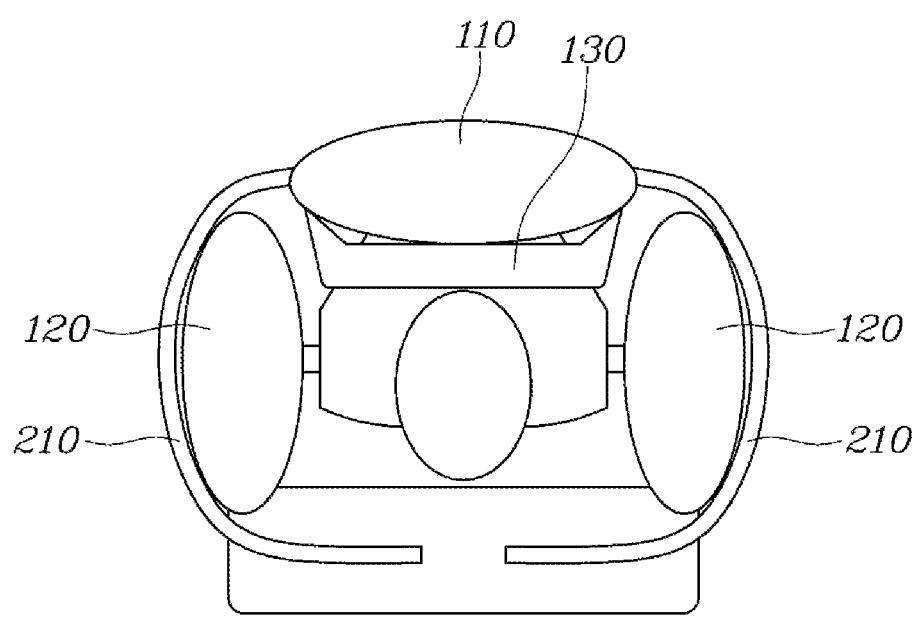
FIG. 3 is a cross-sectional view taken along line A-A in FIG. 1.
Figure 4:
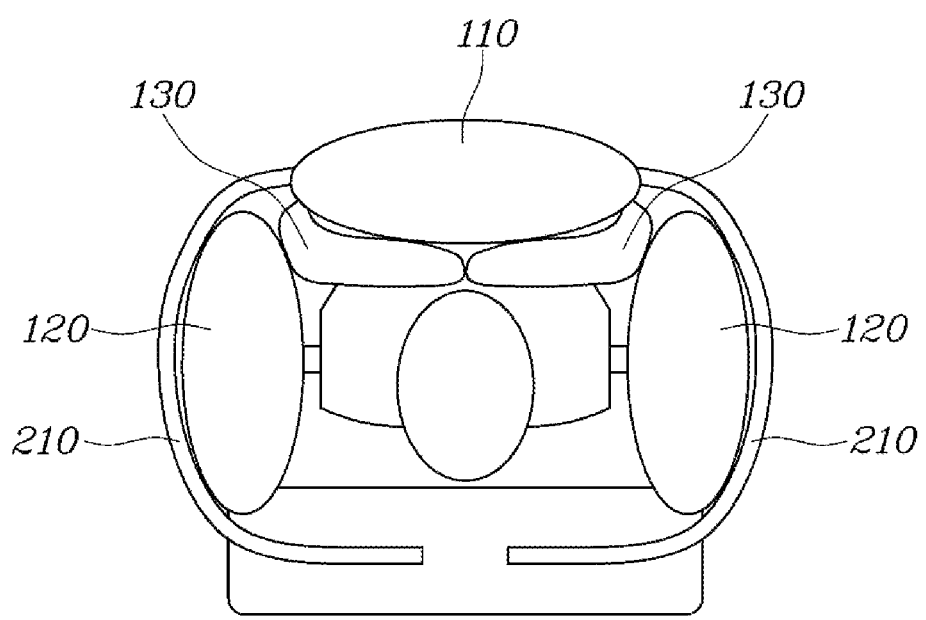
FIG. 4 is a cross-sectional view taken along line A-A in FIG. 1 and illustrating another example of an auxiliary chamber.
Figure 5:
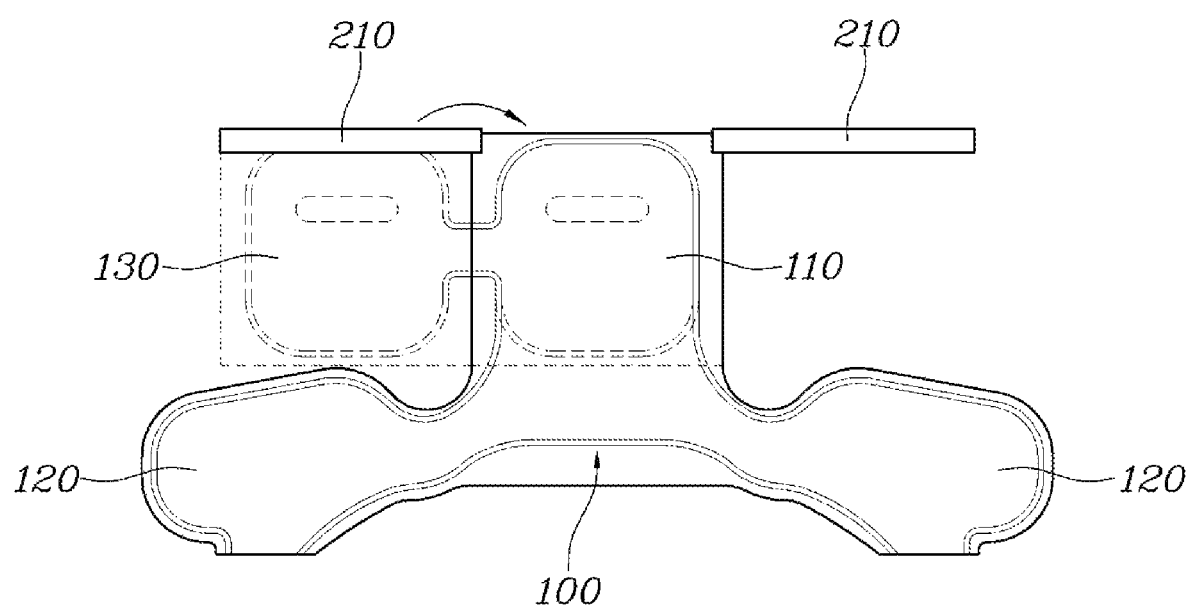
FIGS. 5 to 8 are development views illustrating various embodiments according to the present invention before the seat airbag device for a vehicle is coupled.
Figure 6:
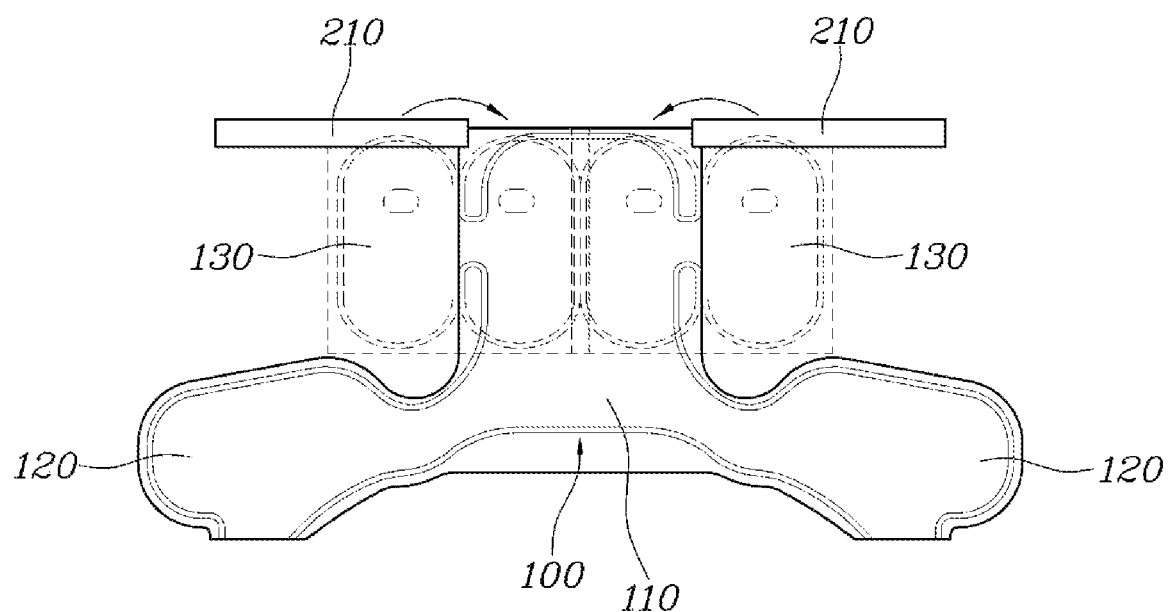

FIG. 1 is a side view illustrating a seat airbag device for a vehicle according to a first embodiment of the present invention, FIG. 2 is a side view illustrating a seat airbag device for a vehicle according to a second embodiment of the present invention, FIG. 3 is a cross-sectional view taken along line A-A in FIG. 1, FIG. 4 is a cross-sectional view taken along line A-A in FIG. 1 and illustrating another example of an auxiliary chamber 130, and FIGS. 5 to 8 are development views illustrating various embodiments according to the present invention before the seat airbag device for a vehicle is coupled.

Exemplary embodiments of a seat airbag device for a vehicle according to the present invention will be described with reference to FIGS. 1 to 8.

Specifically, the seat airbag device for a vehicle according to the present invention includes an airbag cushion 100 and support tethers 210. The airbag cushion 100 includes: lateral chambers 120 positioned at lateral sides of a passenger and configured to be deployed forward from a seatback of a vehicle; a front chamber 110 configured to be deployed forward from an upper side of the seatback to surround the passenger; and an auxiliary chamber 130 configured to be deployed from the front chamber 110 toward a front side of the passenger so as to be positioned between the front chamber 110 and the passenger. The support tethers 210 extend from the seatback and are connected to the airbag cushion 100 to support the airbag cushion 100.

As illustrated in FIGS. 1 to 8, the airbag cushion 100 includes: the front chamber 110 configured to be deployed from the upper side of the seatback toward an upper side of the passenger and extend to the front side of the passenger; the lateral chambers 120 configured to be deployed forward from the lateral sides of the seatback and deployed toward the lateral sides of the passenger; and the auxiliary chamber 130 configured to be deployed toward the passenger from the inside of the front chamber 110. Therefore, the airbag cushion 100 may protect the passenger in all directions.

The front chamber 110 may protect the front side of the passenger in the event of a collision accident in a state in which the passenger is normally seated. The front chamber 110 may protect an upper portion of the passenger's head or prevent the passenger from moving toward the upper side of the seatback when the passenger is in a relaxed posture while reclining against the seatback.

In addition, the lateral chambers 120 are positioned at the lateral sides of the passenger to protect the lateral sides of the passenger from external impact in the event of a collision accident of the vehicle. The lateral chambers 120 may prevent the passenger from moving laterally and colliding with interior components in the vehicle and thus being injured. The lateral chambers 120 may prevent the passengers from colliding with one another and thus being injured in the vehicle.

A frontal collision often occurs as the collision accident of the vehicle. Therefore, the auxiliary chamber 130 may be configured to be deployed toward the passenger and toward a location between a front portion of the front chamber 110 and the passenger, thereby assisting the front portion of the front chamber 110 in attenuating the impact. In addition, the auxiliary chamber 130 may fill a space between the front chamber 110 and the passenger and prevent the passenger from moving forward, thereby supporting the passenger.

One end of the support tether 210 is connected to the seatback, and the other end of the support tether 210 is connected to the airbag cushion 100. The support tether 210 supports the forward/rearward movement of the airbag cushion 100 or the leftward/rightward movement of the airbag cushion 100, thereby preventing the passenger from separating from the inside of the airbag cushion 100.

The other end of the support tether 210 is connected to the front chamber 110, the lateral chamber 120, or the auxiliary chamber 130. The support tether 210 may restrain the passenger while restricting a motion of the airbag cushion 100 caused by external impact.

The lateral chamber 120 may be provided as a pair of lateral chambers 120, and the support tether 210 may be provided as a pair of support tethers 210. The pair of lateral chambers 120 and the pair of support tethers 210 may be disposed at two opposite sides of the passenger.

The pair of lateral chambers 120 is deployed forward from the two opposite lateral sides of the seatback to protect the two opposite sides of the passenger. Therefore, it is possible to prevent impact, which occurs at the door side of the vehicle, from being applied to the passenger. Further, it is possible to prevent the passenger from being injured by colliding with the interior component in the vehicle because of an external collision.

In addition, even in a case in which the passenger cannot predict a direction of a collision of the vehicle such as a situation in which the seat of the vehicle rotates and the passenger is directed in several directions, the seat airbag device may always protect the two opposite sides of the passenger.

Specifically, the auxiliary chamber 130 may extend from the lateral sides of the front chamber 110. The auxiliary chamber 130 may be bent toward the passenger and disposed at the front side of the passenger so as to overlap the front chamber 110.

As illustrated in FIGS. 5 to 8, the airbag cushion 100 may be provided in the form of panels connected to one another. The lateral chambers 120 may be connected to the seatback. The front chamber 110 may be connected to the upper sides of the lateral chambers 120. The auxiliary chambers 130 connected to the lateral sides of the front chamber 110. The auxiliary chamber 130 may be bent from the lateral side of the front chamber 110 toward the passenger and positioned at the front side of the passenger.

Therefore, since the airbag cushion 100 is provided in the form of panels connected to one another, it is not necessary to provide a plurality of airbag cushions 100. In addition, the auxiliary chamber 130 may be disposed in the front chamber 110 and provided at the front side of the passenger.

The ends of the auxiliary chamber 130 extending from the lateral sides of the front chamber 110 may be connected to the front chamber 110 at the sides opposite to the direction in which the auxiliary chamber 130 extends.

In one embodiment of the auxiliary chamber 130, the auxiliary chamber 130 may extend from one side of the front chamber 110 and be bent toward the passenger. Thereafter, the end of the auxiliary chamber 130 is coupled to the other side of the front chamber 110, such that the auxiliary chamber 130 may be disposed at the front side of the passenger.

As described above, the process of manufacturing the auxiliary chamber 130 may be simplified.

In addition, the front chamber 110 and the auxiliary chamber 130 connected to each other at a single portion so that gas injected into the front chamber 110 is injected into the auxiliary chamber 130, such that the auxiliary chamber 130 may be assuredly deployed, and the size of the auxiliary chamber 130 may be maximized.

The auxiliary chamber 130 may be provided as a pair of auxiliary chambers 130. The pair of auxiliary chambers 130 extends from the two opposite sides of the front chamber 110. The pair of auxiliary chambers 130 may be bent toward the passenger, such that the ends of the pair of auxiliary chambers 130 may be connected to each other.

Figure 7:
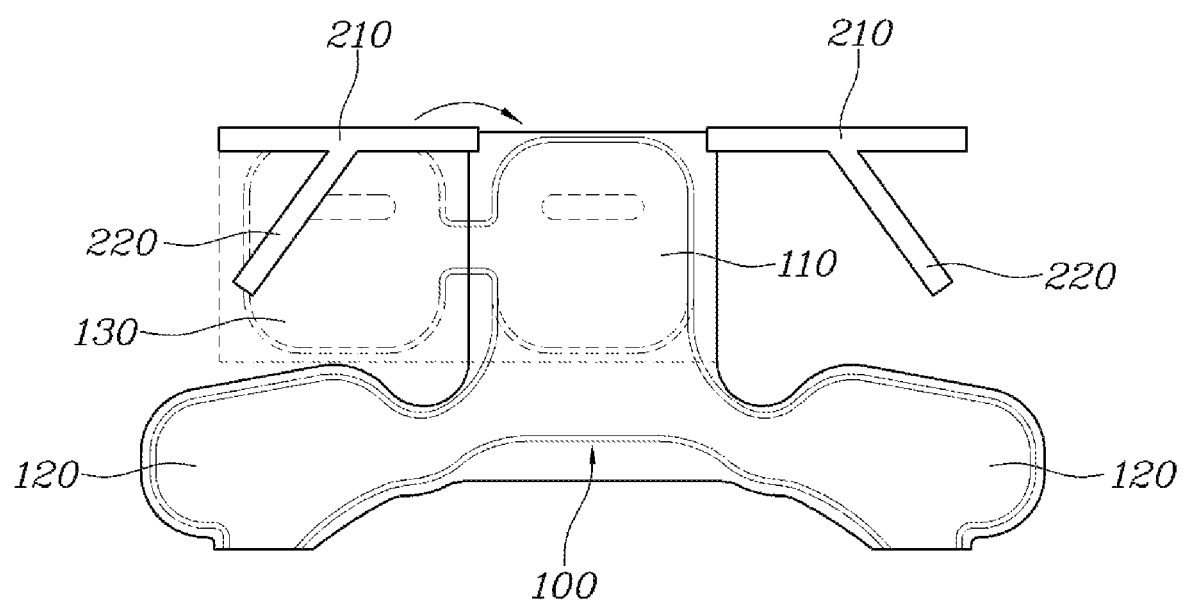
Figure 8:
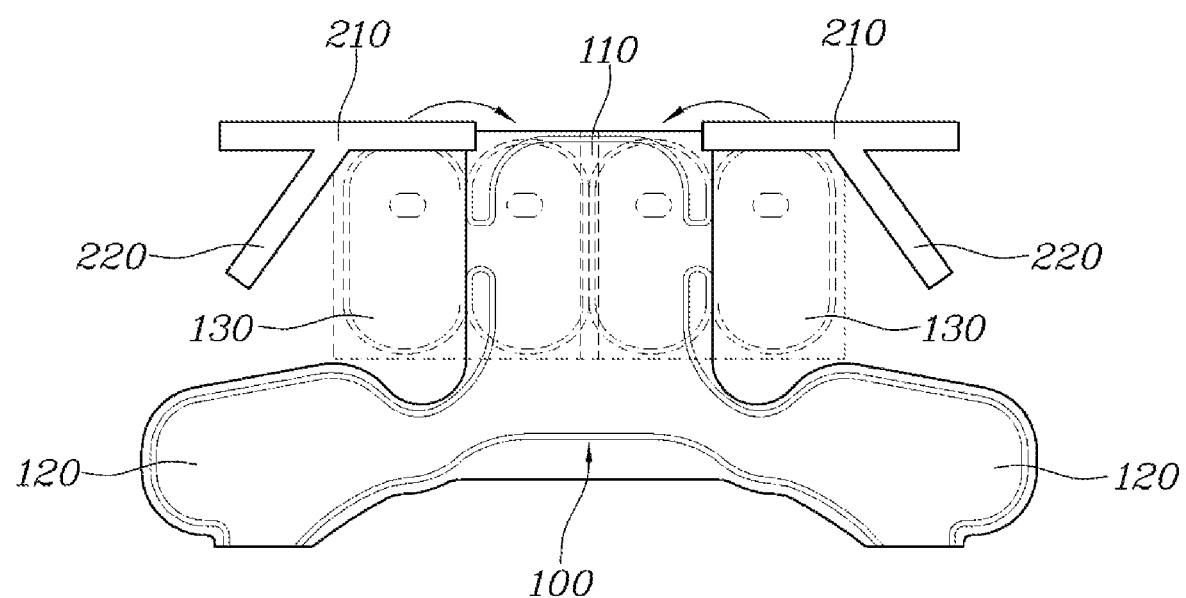

As illustrated in FIGS. 7 to 8, the pair of auxiliary chambers 130 extends from the two opposite sides of the front side of the front chamber 110. The pair of auxiliary chambers 130 is bent toward the passenger, such that the two opposite ends of the pair of auxiliary chambers 130 may be coupled to each other and disposed at the front side of the passenger.

Therefore, the gas is simultaneously injected into the pair of auxiliary chambers 130, such that the auxiliary chambers 130 may be quickly deployed.

The seat airbag device may further include an inflator (not illustrated) connected to the airbag cushion 100 and configured to deploy the airbag cushion 100 by injecting the gas into the airbag cushion 100.

The inflator (not illustrated) may be provided in the seatback, disposed adjacent to the airbag cushion 100, and connected to the airbag cushion 100. In the event of a collision accident of the vehicle, the inflator may receive a collision signal from a collision detection sensor, and explode an explosive disposed therein to generate gas. The inflator may inject the generated gas into the airbag cushion 100.

The airbag cushion 100 may be quickly deployed from the seatback toward the passenger while being folded by gas pressure of the injected gas so as to cut a portion induced to be cut in a mounted state.

The inflator may be connected to the lateral chamber 120 and inject the gas into the lateral chamber 120. The lateral chamber 120 may be connected to the front chamber 110.

As illustrated in FIGS. 5 to 8, the inflator is connected to the lateral chambers 120 and preferentially injects the gas into the lateral chambers 120 to deploy the lateral chambers 120 in order to preferentially protect the lateral sides of the passenger. The lateral chambers 120 are connected to the front chamber 110, such that the front chamber 110 may be sequentially deployed after the lateral chambers 120 are deployed.

A separate airbag device such as a driver seat airbag or an auxiliary seat airbag may be provided at the front side of the passenger. The lateral chambers 120 of the airbag cushion 100 according to the present invention are preferentially deployed to preferentially protect the two opposite sides of the passenger, and then the front chamber 110 may be deployed to protect the front side of the passenger.

As described above, the lateral chambers 120 may be preferentially deployed. The lateral chambers 120 may be connected to the upper portion of the front chamber 110, and the front chamber 110 may be connected to the auxiliary chamber 130.

As illustrated in FIGS. 5 to 8, the upper portions of the lateral chambers 120 are connected to the front chamber 110, such that the gas injected into the lateral chambers 120 flows to the portions where the upper portions of the lateral chamber 120 are connected to the front chamber 110. Therefore, the gas may be injected into the front chamber 110, such that the front chamber 110 may be deployed from the upper surface to the front surface of the front chamber 110.

Therefore, the front chamber 110 may be deployed while extending from the upper surface to the front surface, thereby protecting the passenger from the upper portion to the front portion at one time.

The support tether 210 may extend from the lateral sides of the seatback so as to surround the lateral chamber 120 and be connected to the ends of the front chamber 110.

In one embodiment of the support tether 210, one end of the support tether 210 may be connected to the lateral side of the seatback, the support tether 210 may surround the lateral chamber 120, and the other end of the support tether 210 may be connected to the front chamber 110.

Therefore, the support tether 210 prevents the lateral chambers 120 from separating from each other toward two opposite sides, thereby preventing the passenger from loading to the left and right sides. Further, the support tether 210 prevents the front chamber 110 from moving forward to prevent the passenger from loading forward, thereby restraining the passenger in the airbag cushion 100.

In addition, a single tether may be provided, thereby reducing costs.

The support tether 210 may further include an auxiliary tether 220 extending from the upper side of the seatback, connected to the end of the front chamber 110, extending from the lateral side of the seatback, and connected to the support tether 210.

As another embodiment of the support tether 210, one end of the support tether 210 may be connected to the upper side of the seatback, and the other end of the support tether 210 may be connected to the lateral end of the front chamber 110. The support tether 210 restrains the passenger loading forward, thereby protecting the passenger while supporting the upper side of the lateral chamber 120.

Therefore, the support tether 210 may prevent the front surface of the front chamber 110 from being bent upward by the passenger loading forward because of inertia of the vehicle and prevent the passenger from colliding with a front steering wheel or interior components and thus being injured. In addition, the support tether 210 may support the upper side of the lateral chamber 120, thereby preventing the passenger' head from swaying in the leftward/rightward direction.

An end of the auxiliary tether 220 may be connected to an end of the support tether 210.

As illustrated in FIG. 1, in one embodiment of the auxiliary tether 220, one end of the support tether 210 may be connected to the lateral side of the seatback, and the other end of the auxiliary tether 220 may be connected to the end of the support tether 210.

Therefore, the auxiliary tether 220 may increase a supporting force of the support tether 210 for supporting the forward movement of the front chamber 110.

The end of the auxiliary tether 220 may be connected to a middle portion of the support tether 210.

As another embodiment of the auxiliary tether 220, as illustrated in FIG. 2, one end of the support tether 210 may be connected to the lateral side of the seatback, and the other end of the support tether 210 may be connected to the middle portion of the support tether 210.

Therefore, the auxiliary tether 220 may be positioned adjacent to the lateral chamber 120 and support the lateral movement of the lateral chamber 120, thereby preventing the passenger from loading in the leftward/rightward direction.

While the specific embodiments of the present invention have been illustrated and described above, it will be obvious to those skilled in the art that the present invention may be variously modified and changed without departing from the technical spirit of the present invention defined in the appended claims.

What is claimed is:

1. A seat airbag device for a vehicle including a seat, the seat airbag device comprising:
   an airbag cushion comprising:
   a lateral chamber configured to be deployed from a seatback of the seat and positioned to cover both lateral sides of an object on the seat;

a front chamber configured to be deployed from an upper side of the seatback and positioned to cover a front side of the object on the seat; and an auxiliary chamber configured to be deployed from the front chamber toward the object on the seat and positioned between the front chamber and the object on the seat; and a support tether extending between the seatback and the airbag cushion.

2. The seat airbag device of claim 1, wherein the auxiliary chamber is configured, when deployed, to extend from lateral sides of the front chamber, be bent toward the object on the seat, be positioned in front of the object on the seat and overlap the front chamber.

3. The seat airbag device of claim 2, wherein each end of the auxiliary chamber is connected to a side of the front chamber positioned in a direction opposite to that in which the auxiliary chamber extends.

4. The seat airbag device of claim 1, wherein the auxiliary chamber comprises a pair of auxiliary chambers extending from two opposite sides of the front chamber and bent toward the object on the seat such that ends of the pair of auxiliary chambers are connected to each other.

5. The seat airbag device of claim 1, further comprising an inflator connected to the airbag cushion and configured to inject gas into the airbag cushion.

6. The seat airbag device of claim 5, wherein:
the inflator is connected to the lateral chamber and configured to inject the gas into the lateral chamber, and
the lateral chamber is connected to the front chamber.

7. The seat airbag device of claim 6, wherein:
the lateral chamber is connected to an upper portion of the front chamber, and
the front chamber is connected to the auxiliary chamber.

8. The seat airbag device of claim 1, wherein the support tether extends between a lateral side of the seatback and an end of the front chamber and is configured to, when deployed, surround the lateral chamber.

9. The seat airbag device of claim 1, wherein:
the support tether extends between the upper side of the seatback and the front chamber, and
the seat airbag device further comprises an auxiliary tether extending between a lateral side of the seatback and the support tether.

10. The seat airbag device of claim 9, wherein an end of the auxiliary tether is connected to an end of the support tether.

11. The seat airbag device of claim 9, wherein an end of the auxiliary tether is connected to a middle portion of the support tether.

12. The seat airbag device of claim 1, wherein:
the lateral chamber comprises a pair of lateral chambers configured, when deployed, to be positioned respectively at both lateral sides of the object on the seat, and
the support tether comprises a pair of support tethers configured, when deployed, to be positioned respectively at both lateral sides of the object on the seat.

* * * * *